United States Patent [19]
Schulte

[11] Patent Number: 6,019,061
[45] Date of Patent: Feb. 1, 2000

[54] ARRANGEMENT FOR AND A METHOD OF MANAGING A HERD OF FREELY WALKING ANIMALS

[75] Inventor: Klaus Schulte, Molnbo, Sweden

[73] Assignee: Alfa Laval Agri AB, Tumba, Sweden

[21] Appl. No.: 08/836,145

[22] PCT Filed: Nov. 22, 1995

[86] PCT No.: PCT/SE95/01570

§ 371 Date: Jun. 26, 1997

§ 102(e) Date: Jun. 26, 1997

[87] PCT Pub. No.: WO96/19916

PCT Pub. Date: Jul. 4, 1996

[30] Foreign Application Priority Data

Dec. 28, 1994 [SE] Sweden .................................. 9404542

[51] Int. Cl.[7] .................................................. A01K 1/12
[52] U.S. Cl. ......................................... 119/14.03; 119/840
[58] Field of Search ............................. 119/14.03, 14.14, 119/520, 840

[56] References Cited

U.S. PATENT DOCUMENTS

| | | | |
|---|---|---|---|
| 3,223,070 | 12/1965 | Gribble et al. | 119/14.03 |
| 3,545,407 | 12/1970 | Moore | 119/840 X |
| 4,362,127 | 12/1982 | Nielsen et al. | 119/520 X |
| 5,183,008 | 2/1993 | Carrano | 119/840 |

*Primary Examiner*—Robert P. Swiatek
*Attorney, Agent, or Firm*—Hovey, Williams, Timmons & Collins

[57] ABSTRACT

An arrangement for managing a herd of freely walking animals. The arrangement comprises an area for receiving the animals, a milking station located in the area, automatic milking equipment and a separation device for separating an animal which should be subjected to any kind of special treatment. The animals leaving the milking station have to enter the receiving area, and the separation device is only accessible from the receiving area.

37 Claims, 7 Drawing Sheets

ARRANGEMENT FOR AND A METHOD OF MANAGING A HERD OF FREELY WALKING ANIMALS

BACKGROUND OF THE INVENTION

1. Field of the Invention

The present invention relates to an arrangement for managing a herd of freely walking animals, comprising an area for receiving the animals, a milking station located in said area and having an exit, means for automatic milking of an animal in the milking station, and a separation device located in said area for separating an animal from the herd. The invention also relates to a method of managing a herd of animals freely walking in a receiving area. Furthermore, in a second aspect of the invention, it relates to an arrangement for managing a herd of freely walking animals, comprising an area for receiving the animals and a separation device located in said area for separating an animal from the herd, said device comprising enclosure means defining a separation zone, and at least one entrance device for permitting passage from the receiving area to the separation zone. Furthermore, in a third aspect of the present invention, it relates to a separation device for separating an animal from a herd of freely walking animals, comprising enclosure means defining a separation zone, and at least one entrance device for permitting passage from an area for receiving the herd to the separation zone, said entrance device comprises a first stall, having a front gate device which in an open state permits passage from the first stall to the separation zone and in a closed state prevents passage between the first stall and the separation zone.

2. Description of the Prior Art

Automatic milking of cows is known. Automatic milking may take place in one or more automatic milking stalls provided in an area in which the animals are allowed to walk about freely and find their way individually to the milking stalls. The cows are automatically identified in each stall with the aid of a computer connected to identification means. By means of the computer, in which facts concerning each cow when she was last milked, etc. are stored, a milking robot is activated. The stall also comprises retaining gates which are automatically closed to retain the cow during milking and opened to let the cow leave the stall. Traditionally, cows are milked twice a day. Because of high labour costs it was not interesting to increase the number of milkings per day as long as milking was performed manually. It is however recognized that milking a cow three to four times a day has proved to be of less detriment to her, since the udder is not filled to its maximum between each milking. Such a milking procedure corresponds more closely to the behaviour of the calves and therefore results in healthier cows. As a side effect, however, it is possible to increase the total milk production from one cow by 15–25% by increasing the number of milkings per day. By means of automatic milking machines it is not only possible, but would also be economically interesting to milk the cows more often than twice a day, since the labour costs are not any longer critical. In this case it is rather the high investment cost which is the limiting factor. Therefore, in order to reach a high utilization of the capacity of such automatic milking machines and in order to reach such a high milking frequency by a reasonable number of automatic milking stations, it is desirable or even necessary to enable the cow to develop a trust in the milking station and the automatic milking machine. Only then she will voluntarily and frequently enter the milking station. In view thereof it is of course very important that she does not associate the milking station with anything which hurts or is disagreeable to her.

In order to find out if milking of a cow entering the milking station should be performed, she must be examined to find out whether there is any hinder to milking, for example the cow may be infected by a disease, blood might come in the milk, or the udder and the teats might be injured. Such illness or defects should be treated and cured before the cow can participate in the normal milk production. However, such treatment may hurt the cow or at least be disagreeable to her. Therefore, the performance of such treatment is a negative experience for the cow, which she, due to her very good memory, certainly will remember. Consequently performing such treatment in the milking station may lead to the cow associating the milking station with a negative experience. This makes the milking station less attractive to the cow and therefore in a system based on voluntariness she might not visit the milking station as often as would be desirable in order to reach a high total milk production per day.

It has been proposed in the past to provide means for separating the cow from the milking station to a separation area, in which medical treatment of the cow may take place. Also in this case the cow may associate the milking station with a negative experience of the medical treatment, since she is treated directly after being transferred from the milking station.

It is also known to provide a separation device for separating an animal from an area receiving a herd of freely walking animals, comprising a separation zone, enclosed by enclosure means, and at least one entrance device for permitting passage from said receiving area to the separation zone.

WO-A-8704898 discloses a method and a device for separating selected animals from a herd. To this end, the animals are brought to a sluice comprising a computer for identification and controlling feed distribution, and additional devices for the control of outlets or passages. The separation of selected animals is obtained by the outlets and passages being movable to close and open different outlet areas.

U.S. Pat. No. 5,183,008 discloses a livestock sorting system having an entrance with an identification sensor and first and second aisles extending from the entrance. An automatically controlled gate is actuated between two positions to lead the livestock to either of the two aisles.

DE-C-3 702 465 discloses a method and a device for milking and feeding freely walking cows carrying an identification device. The cows are identified and led to a gate which may be in two positions opening to the milking stalls or the feeding stalls. A cow to be milked is led to the milking stalls and the cows which should not be milked are led to the feeding stalls or back to the free walking area.

SU-A-1 813 383 discloses a separation device comprising enclosure means defining a separation zone, and at least one entrance device for permitting passage from an area to the separation zone. The entrance device comprises a stall, having a front gate device which in an open state permits passage from the stall to the separation zone and in a closed state prevents passage between the stall and the separation zone.

SUMMARY OF THE INVENTION

The object of the present invention is to permit treatment of an animal without negatively influencing a desired behaviour of the animal.

This object is obtained by the arrangement initially defined which is characterized in that the exit of the milking station leads to the receiving area and in that the separation device is accessible by an animal from the receiving area. By means of this arrangement the animal when leaving the milking station, has to enter the receiving area, where the animal is allowed to walk about freely among the other animals of the herd. From the receiving area the animal is then free to enter the separation device, and consequently the animal will not associate any treatment in the separation device with the automatic milking, but will associate the stay in the automatic milking station merely with positive experiences.

According to a preferred embodiment the separation device comprises enclosure means defining a separation zone, and at least one entrance device forming an animal passage leading from the receiving area to the separation zone and adapted to open and close said passage, such that animals entering the separation device may be kept separated from the animals in the herd during for example medical treatment of the separated animal.

Preferably identifying means is provided for identifying an animal entering said passage of the entrance device and an animal entering the milking station.

Another embodiment of the invention provides for examination means for examining the condition of the animal, for example with respect to illness, blood in the milk, injuries of the udder and the teats etc. The result of such an examination may be used for determining whether the animal should be separated. Preferably the examination means is provided in the milking station. Thereby examination may be performed before automatic milking is initiated or during automatic milking by examining the milk.

According to a further embodiment the control means is connected to the identification means, the examination means and the entrance device. Thereby the result of the condition examination of an identified animal can be used to automatically open the passage, and thus the identified animal is able to move into the separation zone.

Preferably the entrance device comprises a stall, the interior of which comprises said animal passage. The different stalls normally provided in a barn are places which the animals are likely to enter. Preferably the stall comprises a gate which permits passage to the separation zone.

According to an embodiment the control means is connected to the gate device. Thus, opening of the gate device leading to the separation zone can be initiated by the control device when an animal which is to be separated is present in the stall.

According to a further embodiment the stall is also provided with an additional gate device which is controlled by the control means and which can be closed to prevent the animal being present in the stall to go backwards back to the receiving area.

According to a further embodiment the stall comprises a feeding device for feeding an animal being present in the stall. Feeding stalls have an enticing effect on animals so that the animals are very likely to enter the feeding stalls often and voluntarily. Preferably the feeding device is adapted to feed the animals with concentrate.

According to a further embodiment the separation device comprises at least one exit device forming a further animal passage leading from the separation zone to the receiving area and adapted to open and close said further animal passage. By such an exit device, it is possible to lead the animal back to the receiving area after a certain period of time. It may for example be desirable to separate, for a certain period of time, an animal which is very active and has visited the milking station several times within a short time period, thereby hindering less active animals from reaching the milking station. Moreover, even if an animal is suffering from a disease it might be desirable to let her out of the separation zone if no action has been taken to cure the disease within a certain period of time, since otherwise her position in the herd of animals may be disturbed.

Further embodiments of the exit device may include a further stall which has a further animal passage and a gate device which in an open state permits passage between the further stall and a receiving area and when closed prevents passage between the further stall and the receiving area, and where the exit device may include a feeding device.

According to another embodiment the receiving area comprises a first zone and a second zone. By dividing the receiving area in such zones, it is possible for example to arrange the milking station indoors and provide an area outdoors where the animals may walk about freely. Thereby, a gate device may be provided between the first zone and the second zone.

The object defined above is also obtained by a method of managing a herd of freely walking in a receiving area, comprising:

examining the condition of an animal in connection with automatic milking in a milking station located in the receiving area, for example with respect to illness, blood in the milk, injuries of the udder and the teats, in order to determine whether the animal should be subjected to any kind of treatment, storing an identification of the animal if the latter is to be treated as a result of the examination, using the stored identification for identifying the animal participating in an activity other than automatic milking, and separating the identified animal from the herd.

Such a method permits at any time separation of an animal which has left the milking station and is walking about freely. With such a method there is no risk that the animal should associate the separation with the automatic milking. Preferably the other activity takes place remote from the automatic milking. A great distance between the automatic milking station and the separation is advantageous.

According to a further embodiment of the method the other activity comprises feeding of the animal, for example with concentrate, which has a strong enticing effect on the animal.

The object defined above is also obtained by the arrangement in the second aspect of the invention as initially defined which is characterized in that the entrance device comprises a stall having a front gate device which in an open state permits passage from the stall to the separation zone and in a closed state prevents passage between the stall and the separation zone. Such a separation device can be provided anywhere in the receiving area, for example a barn, for freely walking animals. Thus the animals are free to enter such a separation device from the receiving area without associating the separation with any other treatment, such as medical treatment, massaging, or milking, taking place remote from the separation device. According to a preferred embodiment, the stall has a rear gate device. Such a rear gate device prevents an animal, which is to be separated, from going backwards back to the receiving area.

According to further embodiments, identification means and control means are provided for automatically controlling the state of the gates, such that when an identified animal present in the stall is to be separated the rear gate device is closed and the front gate device is opened.

According to a further embodiment the stall comprises a feeding device which preferably may be arranged to dispense concentrate.

Further embodiments of this arrangement provide an exit device forming a further animal passage leading from the separation zone to the receiving area and adapted to open and close the further animal passage. The exit device may provide a further stall, the interior of which defines a further animal passage, and where the further stall includes a gate device which when open permits the animal to pass between the further stall and the receiving area, and when closed prevents passage of an animal between the further stall and the receiving area. The exit device may include a feeding device. The receiving area may include a first zone and a second zone, where the milking station or the separation device may be provided in the first zone and where the gate device may be provided between the first zone and the second zone.

The object defined above is also obtained by the separation device initially defined, which is characterized in that it comprises an exit device having a second stall with a front gate device which in an open state permits passage from the second stall to said area and in a closed state prevents passage between the second stall and said area.

Preferred embodiments of the separation device include providing a means for identifying an animal present in at least one of the first and second stalls. The first stall may be provided with a rear gate device which, in an open state, permits passage of an animal from the stall to the receiving area and vice versa, and in a closed state, prevents passage between the stall and the receiving area. A means for controlling the front gate device and the rear gate device may be provided, which controls the front gate device and the rear gate device in response to the identification means identifying an animal present in the stall, such that the front gate device is opened and the rear gate device is closed if the identified animal is to be separated. At least one of the first and second stalls may be provided with a feeding device for feeding an animal present in the stall with, for example, a concentrate. The second stall may be provided with a rear gate device which, in an open state, permits passage from the second stall to the separation zone and vice versa, and in a closed state, prevents the passage between the second stall and the separation zone.

BRIEF DESCRIPTION OF THE DRAWING

Different embodiments of the present invention will now be described with reference to the accompanying drawings, in which.

DESCRIPTION OF THE PREFERRED EMBODIMENTS

Figure 1:
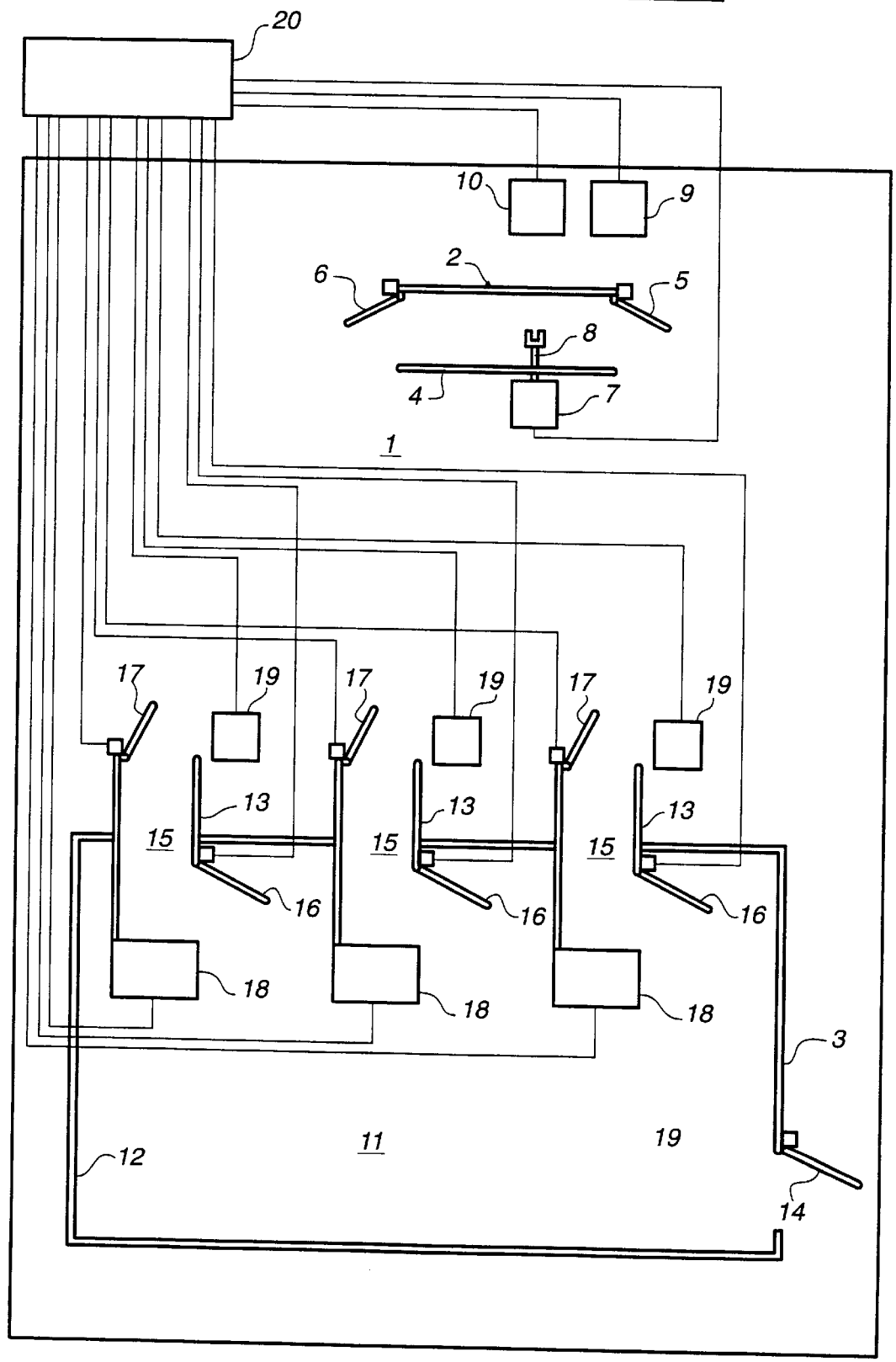
FIG. 1 shows a schematical view from above of an arrangement for managing a herd of freely walking animals.

The figures show an arrangement comprising a receiving area 1 for receiving a herd of freely walking animals. In the following description reference will be made only to cows. It is however clear that the present invention also can be applied to other animals, especially such animals which may be milked, for example sheep, goats, buffaloes and horses. The receiving area 1 may for example be a barn or an area provided outdoors, which may be enclosed by a fence. In the receiving area 1 there is provided a milking station 2 and a separation device 3. The milking station 2 comprises a stall 4 with an entrance gate 5 and an exit gate 6. Furthermore, the milking station 2 comprises an automatic milking machine 7 which is provided with a robot arm 8 for applying teat cups (not shown) on the teats of the cow present in the stall 4. The milking station 2 also comprises an identification device 9, for identifying a cow entering the milking stall 4, and an examination device 10 for examining the condition of the animal with respect to illness, for example mastitis, blood in the milk, injuries on the udder and the teats. The examination device 10 or an additional examination device may be provided outside the milking station 2. Furthermore, the examination device may comprise means for making activity measurements on the cow in order to determine if she is on heat, or means for identifying cows being too active in respect of the milking station, i.e. cows visiting the milking station more than a certain number of times per day will hinder less active cows from being milked, and therefore it may be desirable to separate such highly active cows, at least for a certain period of times.

The separation device comprises a separation zone 11 which is enclosed by an enclosure 12, for example a fence. In the separation zone 11 any kind of treatment may be performed on the cow which has been separated. The treatment might be any medical treatment, for example curing a disease by an injection. It might also be insemination or manual milking in the case that the automatic milking did not succeed. Finally it might be applying an earmark or even that the cow should be separated to be brought to slaughtery. In the enclosure 12 there are provided three entrance devices 13 and an exit device 14 to permit removal of a cow from the separation zone 11. The entrance devices 13 are forming animal passages 15 leading from the receiving area 1 to the separation zone 11. However, it should be noted that more or less such entrance devices 13 might be provided. Each entrance device comprises a stall having a front gate device 16 and a rear gate device 17. In each stall there is provided a feeding device 18. The feeding device 18 may be of the type which offers the cows concentrate. Such feed is particularly attractive to the cows and therefore they frequently visit such feeding stalls. Moreover, when entering the stall for eating concentrate, the cows need only to be present in the stall for a short period of time. The feeding device 18 may also be of the type which offers the cows ensilage or a mixture of ensilage and concentrate. Furthermore, there is provided an identification device 19 at each entrance device for identifying a cow entering the stall.

Figure 2:
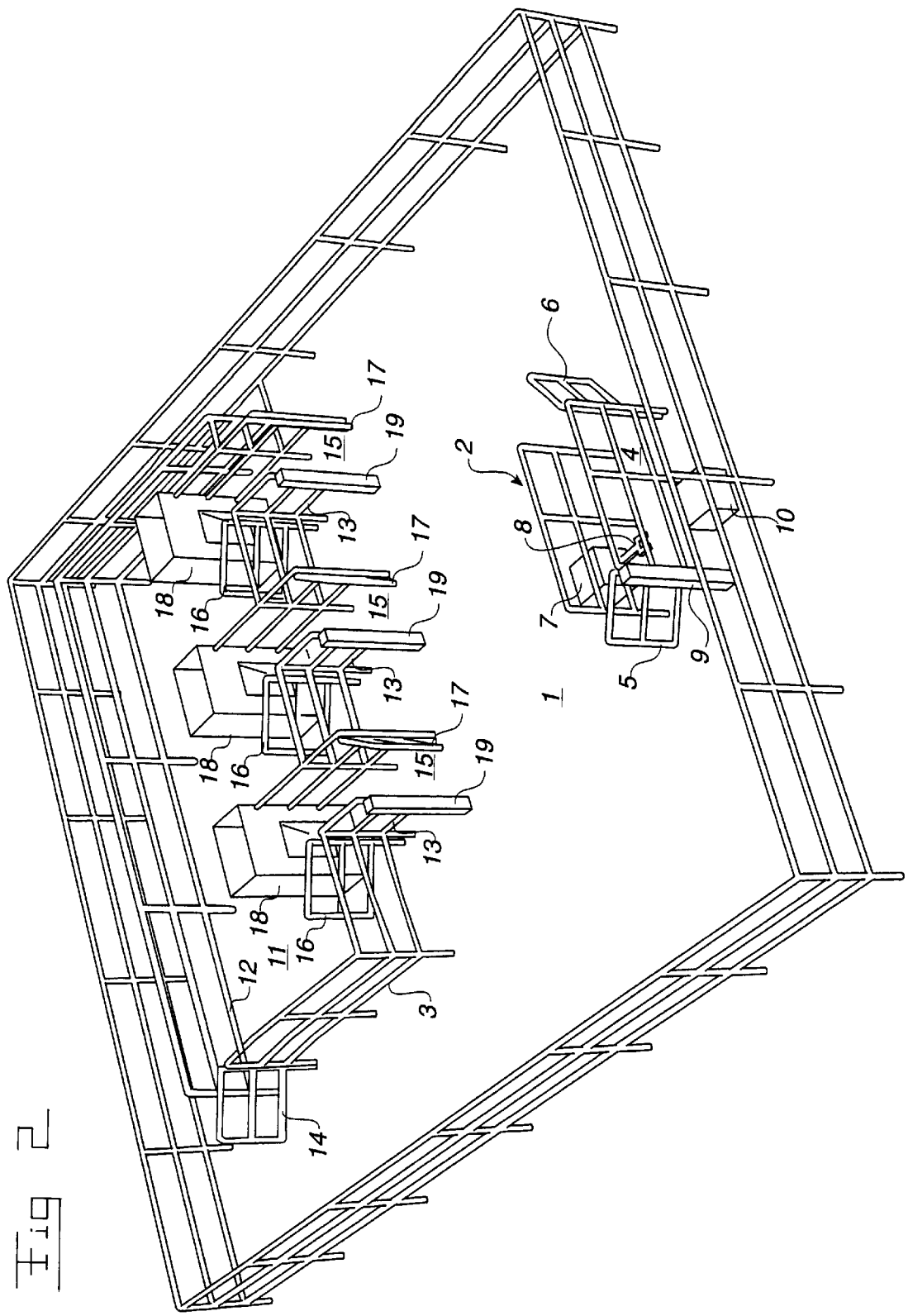
FIG. 2 shows a perspective view of the arrangement.
Figure 3:
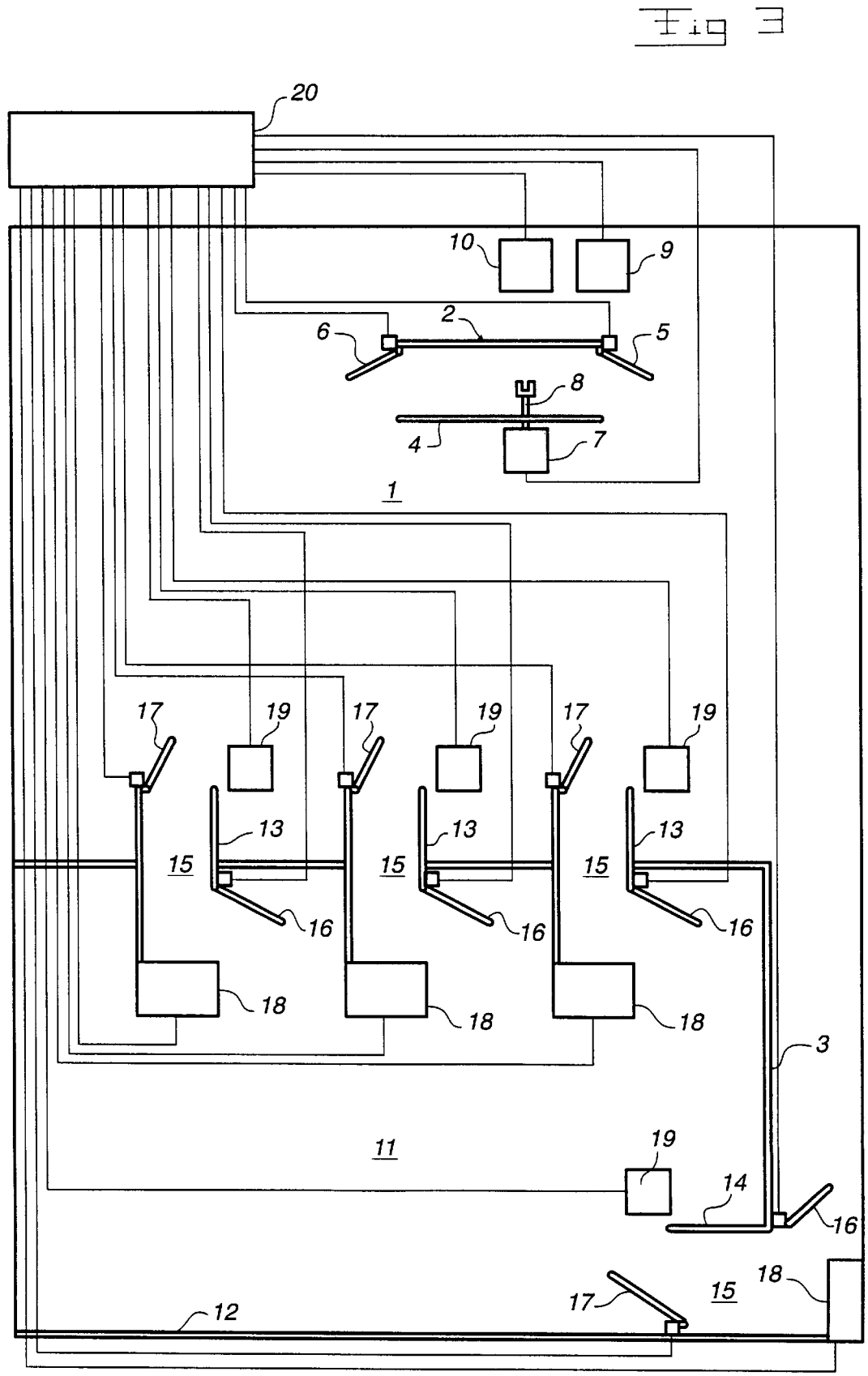
FIG. 3 shows a schematical view from above of a modified arrangement for managing a herd of freely walking animals.
Figure 4:
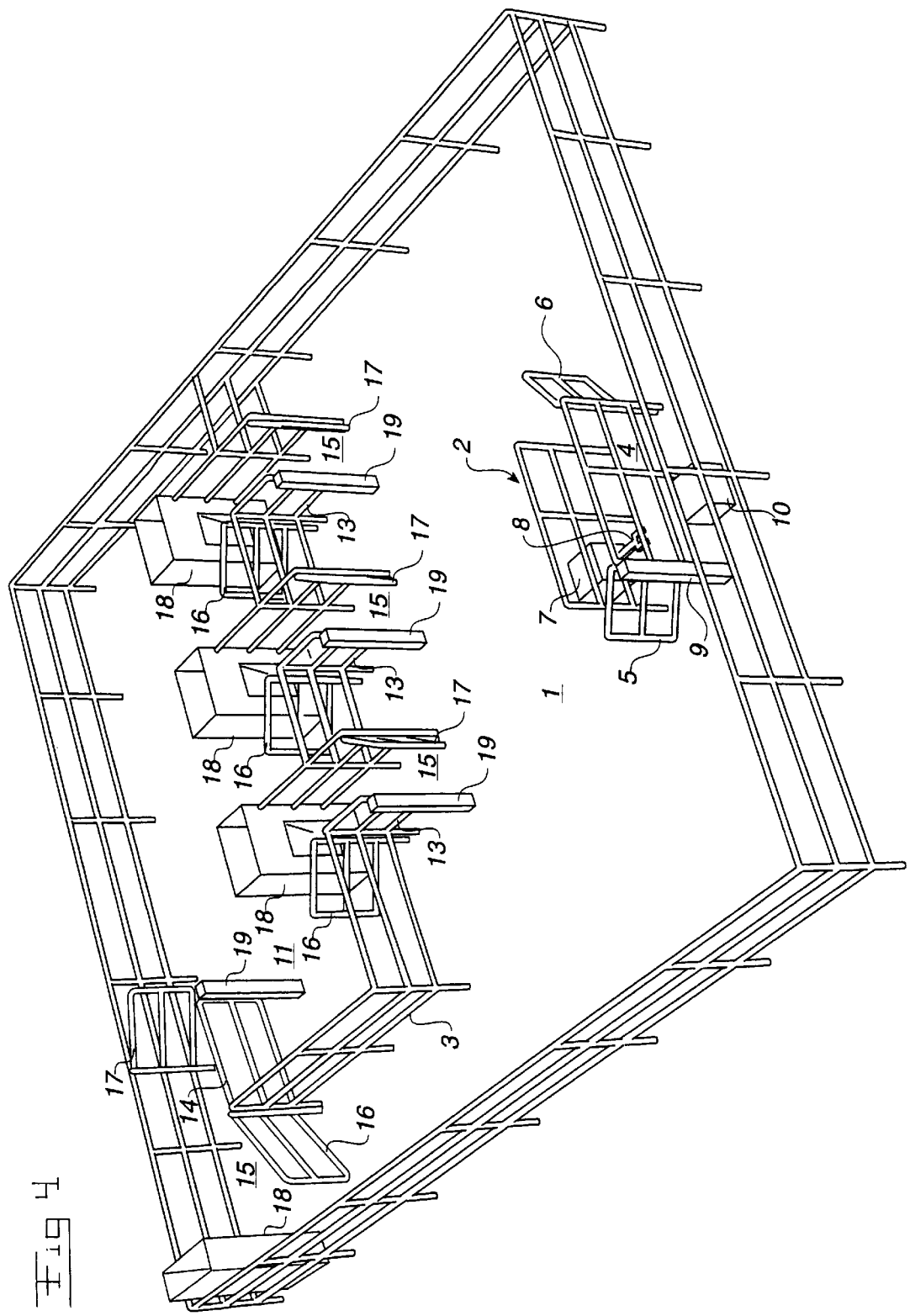
FIG. 4 shows a perspective view of the arrangement in FIG. 3, and FIGS. 5–7 show in a schematical view from above of the arrangement, alternative dispositions of different parts.

The exit device 14 may be in a form of a manually operated gate as disclosed in FIGS. 1 and 2, or, as disclosed in FIGS. 3 and 4, a device similar to the entrance devices 13. This means that the exit device 14 is forming an animal passage 15, leading from the separation zone 11 to the receiving area 1, and comprising a stall having a front gate device 16, a rear gate device 17 and a feeding device 18 of the same type as in the entrance device stalls. Furthermore, an identification device 19 is provided at the exit device 14 for identifying the cow entering the exit device 14.

For controlling the arrangement a control device 20 is provided. As can be seen in FIGS. 1 and 3 the control device 20 is connected to the entrance gate 5 and the exit gate 6, the automatic milking machine 7, the identification device 9, and the examination device 10. The control device 20 may also be connected to the entrance devices 13 and, as disclosed in FIGS. 3 and 4, the exit device 14, i. e. each front gate device 16, each rear gate device 17, each feeding device 18, and each identification device 19.

Figure 5:
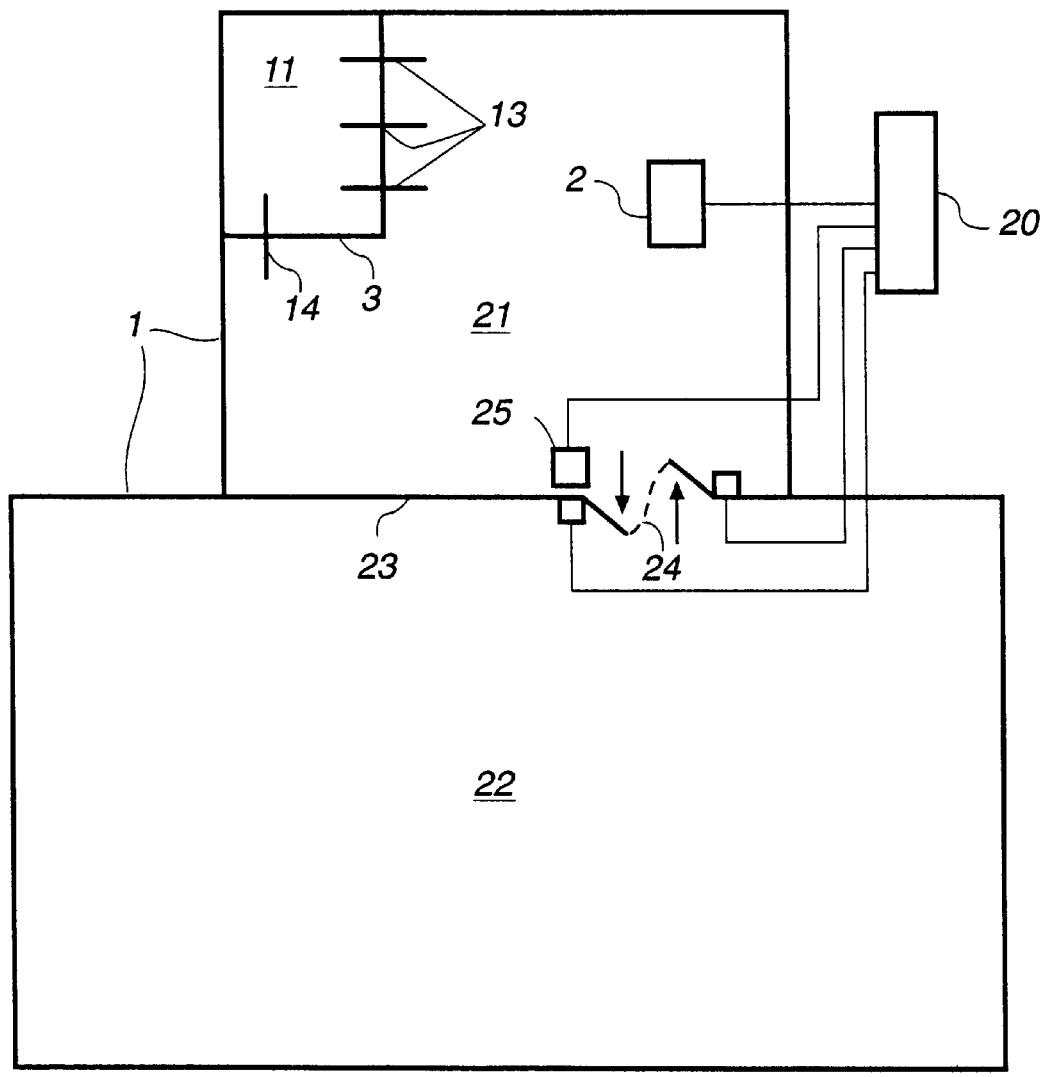
Figure 6:
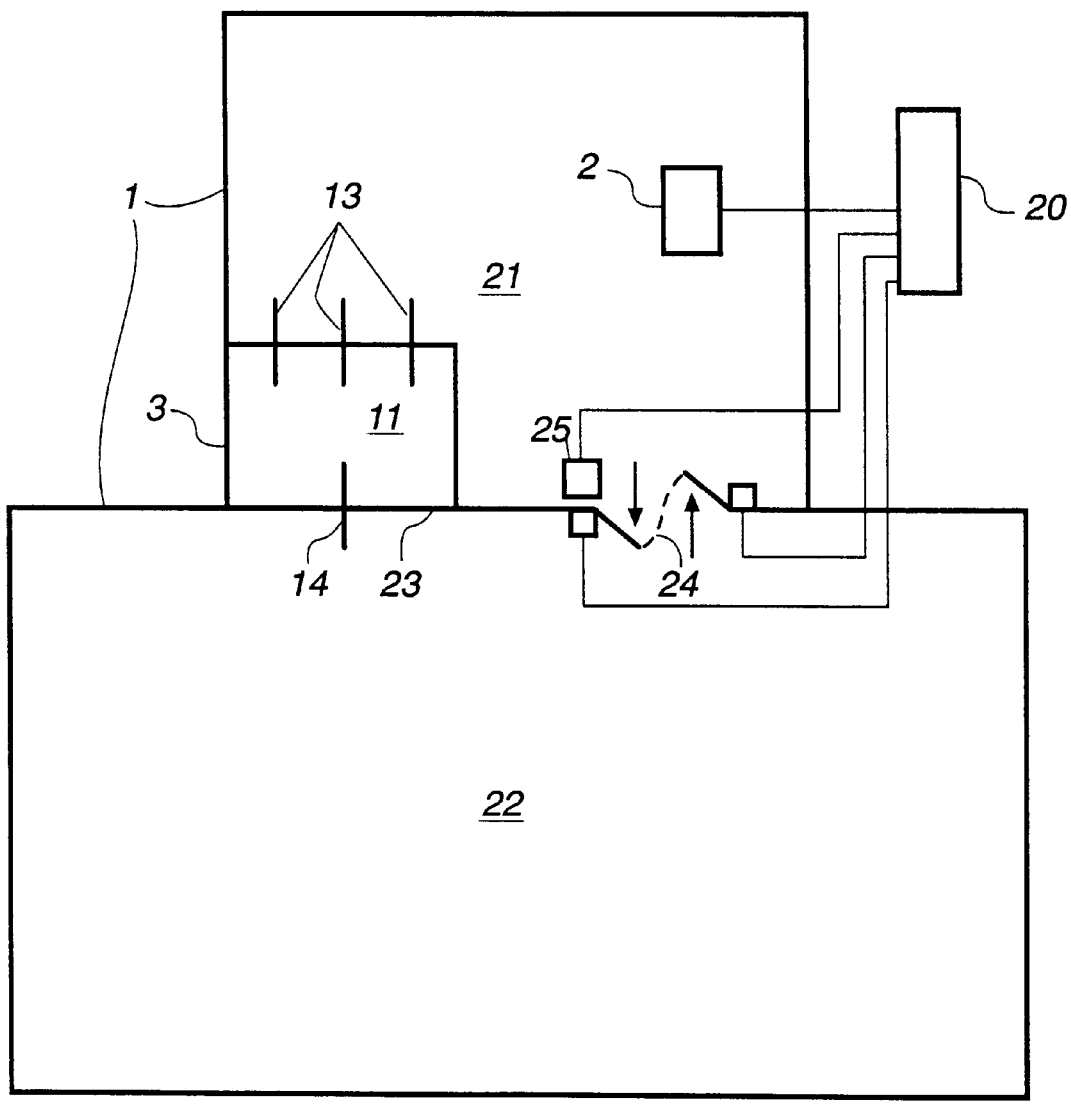
Figure 7:
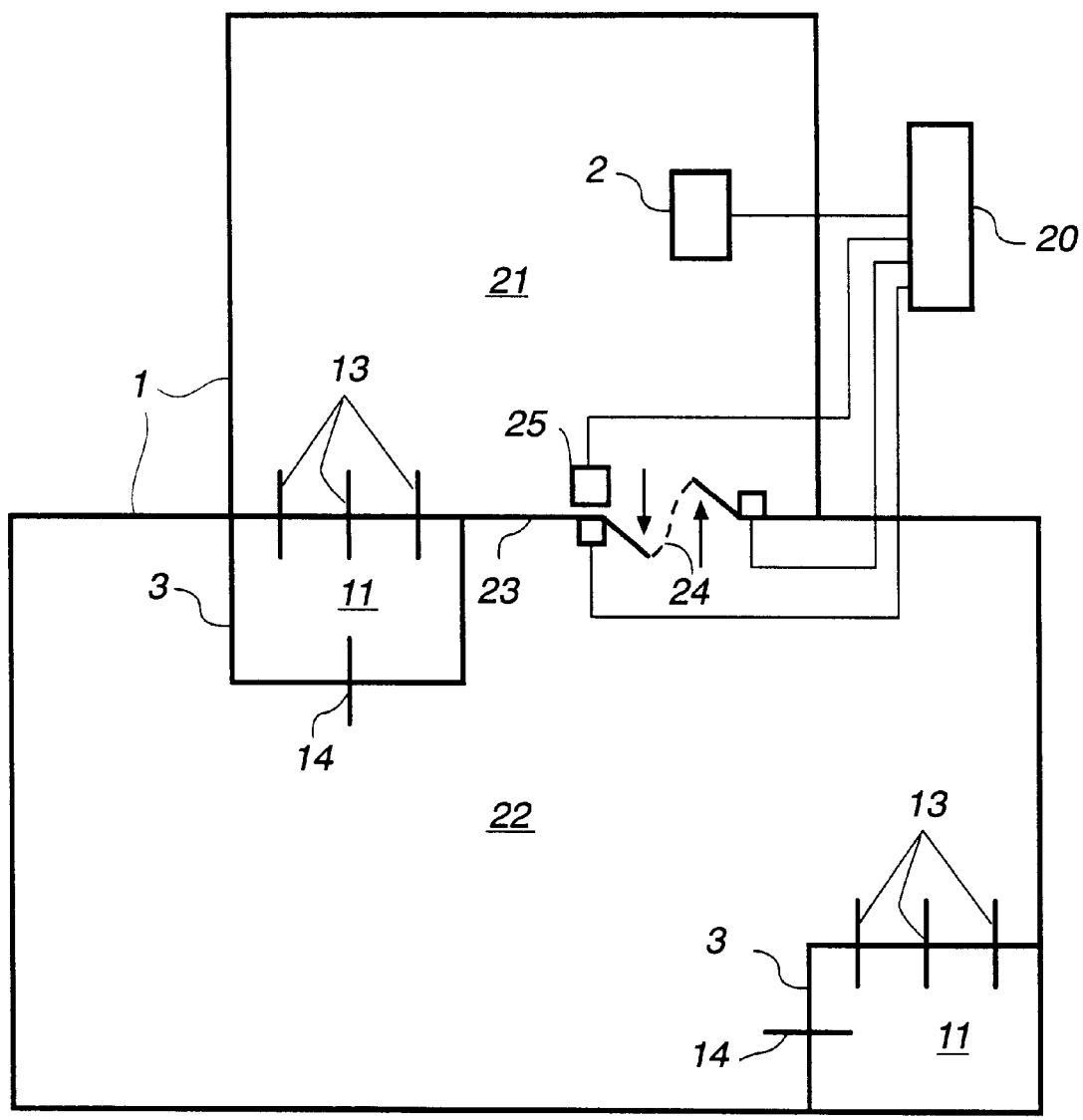

As may be seen from FIGS. 5, 6, 7, the receiving area 1 may be divided into two zones, a first zone 21 and a second zone 22. The first zone 21 may be provided indoors, outdoors or have an indoor and an outdoor area, and in the same way the second zone 22 may be provided indoors, outdoors or have an indoor and an outdoor area. Thereby, as disclosed in FIG. 5, the milking station 2 and the separation device 3 may be provided in the first zone 21. As may be seen, both the entrance devices 13 and the exit device 14 of the separation device 3 are leading from and to, respectively, the first zone 21. Alternatively, as may be seen in FIG. 6, the entrance devices 13 of the separation device 3 may be arranged such that they are accessible from the first zone 21 and the exit device 14 is leading to the second zone 22. FIG. 7 discloses two possible locations for the separation device in the second zone 22.

The first zone 21 and the second zone 22 may be separated by a fence 23. In the fence 23 a gate device 24 is provided to give access to the two zones 21, 22. In order to be able to control the cow traffic between the first zone 21 and the second zone 22, the gate device 24 may be connected to and controlled by the control device 20. Thereby, an identification device 25, which also is connected to the control device 20, should be provided in the proximity of the gate device 24, for identifying a cow approaching the gate device 24. Thus, it is possible to permit or deny access to the first and second zone 21 for an individual cow.

The arrangement functions as follows. The cows are staying in the receiving area 1. A cow which needs to be milked enters voluntarily the milking station 2. There she is identified by the identification device 9, undergoes a condition examination by the examination device 10 and is milked by the automatic milking machine 7. The condition examination may be performed by optical means (not shown) to detect an external injury on the udder and the teats or that the udder and the teats are not clean. The condition examination may also be performed by measurements on the milk, concerning for example conductivity or temperature for detecting diseased cows. Furthermore, it is possible to measure the presence and the quantity of different microbes in the milk.

The result of the examination is stored and processed by the control device 20. If the result does not indicate any defects the milk is delivered and the cow leaves the milking station 2 through the exit gate 6 and enters the receiving area 1. If on the other hand the result indicates a disease or some other defect the milk is transported to a waste tank and the cow leaves the milking station 2 through exit gate 6 and enters the receiving area 1. Furthermore, if the robot arm 8 of the milking machine 7 does not succeed in bringing the teat cups on the teats the exit gate 6 is opened so that the cow might leave the milking station 2 and enter the receiving area 1. In the receiving area 1, the cow is allowed to walk about freely again and will after a while enter one of the feeding stalls 13. If the examination result indicates that a specific cow should be separated due to any of the defects mentioned above, due to the fact that milking did not succeed, or that the cow should be inseminated etc., the rear gate device 17 will be closed when this specific cow has entered the stall 13 and is identified by the identification device 19. In the stall 13 the cow might be offered feed through the feeding device 18. However, the front gate device 16 is opened by means of the control device 20, and thus the cow has to enter the separation zone 11. Thereafter, the front gate device 16 is closed and any treatment could be performed on the cow so separated. After the treatment the cow might be removed to the receiving area through the exit gate 14.

For the cows which should not be separated the stalls 13 are functioning as normal feeding stalls, i.e. cows entering the stalls 13 for eating might after the eating has finished leave the stall 13 backwards through the rear gate device 17. It is an advantage if all of the feeding stalls 13 in the receiving area 1 are entrance devices forming passages 15 leading to the separation zone 11, since in this case the cows cannot avoid a feeding stall in which they might be separated.

To sum up, the arrangement and the separation device permit a way to separate automatically a cow from a herd, which cow for some reason should be subjected to special treatment, such that the cow cannot associate this treatment with the automatic milking or any other treatment and therefore the separation will not influence the behaviour of the cow concerning her willingness to enter the milking station or a stall for the performance of said other treatment.

The present invention is not limited to the embodiments disclosed above but may be modified within the scope of the claims. E.g. more than one separation device 3 may be provided within the receiving area 1.

I claim:

1. An arrangement for managing a herd of freely walking animals, comprising:

an area for receiving the animals;

a milking station located in said area and having an exit;

means for automatic milking of an animal in the milking station; and a separation device located in said area for separating an animal from the herd wherein the exit of the milking station leads to the receiving area and wherein the separation device is accessible by an animal from the receiving area, said separation device comprising enclosure means defining a separation zone and at least one entrance device forming an animal passage leading from the receiving area to the separation zone for opening and closing said passage.

2. An arrangement according to claim 1, including identification means for identifying an animal entering said passage of the at least one entrance device and an animal entering the milking station.

3. An arrangement according to claim 2, including examination means arranged to examine the condition of an animal in the milking station with respect to illness, blood in the milk, injuries of the udder and the teats, or activity of the animal.

4. An arrangement according to claim 3, including control means for recording an animal in the milking station identified by the identification means and requiring treatment as a result of a condition examination of the animal by the examination means.

5. An arrangement according to claim 4, wherein the control means controls the at least one entrance device to open said passage of the at least one entrance device in response to the identification means identifying a recorded animal entering said passage, whereby said recorded animal is able to move into the separation zone.

6. An arrangement according to claim 5, wherein the at least one entrance device comprises a stall, the interior of which comprises said animal passage.

7. An arrangement according to claim 6, wherein the stall has a gate device which in an open state permits passage between the stall and the separate zone and in a closed state prevents passage between the stall and the separation zone.

8. An arrangement according to claim 7, wherein the control means controls the gate device to change between its opened and closed states.

9. An arrangement according to claim 8, wherein the stall has an additional gate device, which in an open state permits passage between the stall and the receiving area and in a closed state prevents passage between the stall and the receiving area.

10. An arrangement according to claim 9, wherein the control means controls the additional gate device to change between its opened and closed states.

11. An arrangement according to claim 6, wherein the stall comprises a feeding device for feeding an animal which is present in the stall.

12. An arrangement according to claim 1, wherein the separation device comprises at least one exit device forming a further animal passage leading from the separation zone to the receiving area and which serves to open and close said further animal passage.

13. An arrangement according to claim 12, wherein the exit device comprises a further stall, the interior of which comprises said further animal passage, and that said further stall comprises a gate device which in an open state permits passage between said further stall and the receiving area and in a closed state prevents passage between said further stall and the receiving area.

14. An arrangement according to claim 12 wherein said exit device comprises a feeding device.

15. An arrangement according to claim 1, wherein the receiving area comprises a first zone and a second zone.

16. An arrangement according to claim 15, wherein the milking station is provided in the first zone.

17. An arrangement according to claim 15, wherein the separation device is provided in the first zone.

18. An arrangement according to claim 15, including a gate device provided between the first zone and the second zone.

19. A method of managing a herd of animals freely walking in a receiving area, comprising the steps of:
examining the condition of an animal in connection with automatic milking in a milking station located in the receiving area with respect to illness, blood in the milk, or injuries on the udder and the teats, in order to determine whether the animal should be subjected to any kind of treatment;
storing an identification of the animal if the latter is to be treated as a result of the examination;
using the stored identification for identifying the animal participating in an activity other than automatic milking; and
separating the identified animal from the herd.

20. A method according to claim 19, wherein said activity takes place remote from the automatic milking.

21. A method according to claim 19, wherein said activity comprises feeding the animal.

22. An arrangement for managing a herd of freely walking animals comprising:
an area for receiving the animals; and
a separation device located in said area for separating an animal from the herd, said device comprising enclosure means defining a separation zone and at least one entrance device for permitting passage from the receiving area to the separation zone,
wherein at least one entrance device comprises a stall having a front gate device which in an open state permits passage from the stall to the separation zone and in a closed state prevents passage between the stall and the separation zone,
wherein the separation device further comprises at least one exit device forming a further animal passage leading from the separation zone to the receiving area for opening and closing said further animal passage, said at least one exit device comprising a further stall, the interior of which comprises said further animal passage, said further stall comprising a gate device which in an open state permits passage between said further stall and the receiving area and in a closed state prevents passage between said further stall and the receiving area.

23. An arrangement according to claim 22, wherein the stall has a rear gate device which in an open state permits passage from the stall to the receiving area and vice versa, and in a closed state prevents passage between the stall and the receiving area.

24. An arrangement according to claim 22 including identification means provided for identifying an animal present in the stall.

25. An arrangement according to claim 24, including control means adapted to control the front gate device and the rear gate device in response to the identification means identifying an animal present in the stall, such that the front gate device is opened and the rear gate device is closed if the identified animal is to be separated.

26. An arrangement according to claim 22, wherein the stall is provided with a feeding device for feeding an animal which is present in the stall.

27. An arrangement according to claim 22, wherein said at least one exit device comprises a feeding device.

28. An arrangement according to claim 22, wherein the receiving area comprises a first zone and a second zone.

29. An arrangement according to claim 28, including a milking station provided in the first zone.

30. An arrangement according to claim 28, wherein the separation device is provided in the first zone.

31. An arrangement according to claim 28, including a gate device provided between the first zone and the second zone.

32. A separation device for separating an animal from a herd of freely walking animals, comprising:
enclosure means defining a separation zone; and
at least one entrance device for permitting passage from an area for receiving the herd to the separation zone, said at least one entrance device comprising a first stall having a front gate device which in an open state permits passage from the first stall to the separation zone and in a closed state prevents passage between the first stall and the separation zone, wherein the separation device comprises an exit device having a second stall with a front gate device which in an open state permits passage from the second stall to said area and in a closed state prevents passage between the second stall and said area.

33. An arrangement according to claim 32, including identification means provided for identifying an animal present in at least one of the first and second stall.

34. An arrangement according to claim 33, including control means adapted to control the front gate device and the rear gate device in response to the identification means identifying an animal present in the stall, such that the front gate device is opened and the rear gate device is closed if the identified animal is to be separated.

35. An arrangement according to claim 32, wherein the first stall has a rear gate device which in an open state permits passage from the stall to the receiving area and vice versa, and in a closed state prevents passage between the stall and the receiving area.

36. An arrangement according to claim 32, wherein at least one of the first and second stalls is provided with a feeding device for feeding an animal which is present in the stall.

37. An arrangement according to claim 32, wherein the second stall has a rear gate device which in an open state permits passage from the second stall to the separation zone and vice versa, and in a closed state prevents passage between the second stall and the separation zone.

* * * * *

UNITED STATES PATENT AND TRADEMARK OFFICE
CERTIFICATE OF CORRECTION

| | | |
|---|---|---|
| PATENT NO. | : 6,019,061 | Page 1 of 1 |
| DATED | : February 1, 2000 | |
| INVENTOR(S) | : Klaus Schulte | |

It is certified that error appears in the above-identified patent and that said Letters Patent is hereby corrected as shown below:

<u>Title page,</u>
Item [22], should read:
-- [22]  PCT Filed:  December 22, 1995 --

Signed and Sealed this

Eleventh Day of November, 2003

JAMES E. ROGAN
*Director of the United States Patent and Trademark Office*